UNITED STATES PATENT OFFICE.

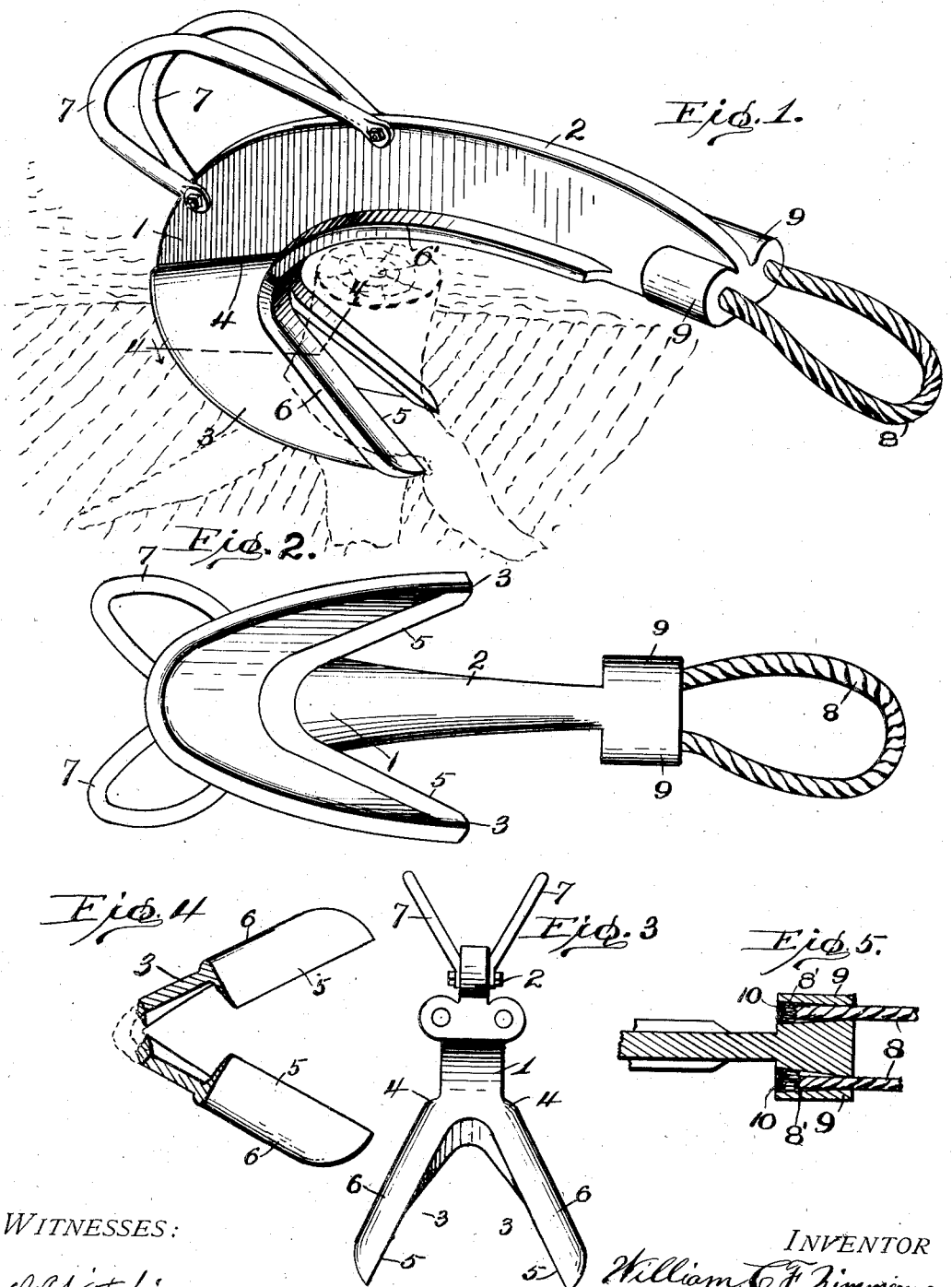

WILLIAM C. F. ZIMMERMAN, OF LONE TREE, IOWA.

STUMP-PULLER.

No. 905,399.　　　　Specification of Letters Patent.　　　　Patented Dec. 1, 1908.

Application filed March 16, 1908. Serial No. 421,364.

*To all whom it may concern:*

Be it known that I, WILLIAM C. F. ZIMMERMAN, a citizen of the United States, residing at Lone Tree, in the county of Johnson and State of Iowa, have invented certain new and useful Improvements in Stump-Pullers; and I do hereby declare the following to be a full, clear, and exact description of the invention, such as will enable others skilled in the art to which it appertains to make and use the same.

The object of the present invention is to provide means for engaging a stump for extracting the same and adapted to retain a hold on the stump until the stump is extracted or severed a considerable depth underground.

With this and further objects in view, the invention comprises certain novel constructions, combinations and arrangements of parts as will be hereinafter fully described and claimed.

In the accompanying drawing:—Figure 1 is a perspective view of a stump puller embodying the features of the present invention. Fig. 2 is an inverted plan view thereof. Fig. 3 is a front end view thereof. Fig. 4 is a horizontal section taken on the plane indicated by line 4, 4 of Fig. 1, and looking downwardly. Fig. 5 is an enlarged, detail, horizontal section taken through the cable connection for the stump puller.

In the stump pulling art, difficulty has been experienced, particularly with stumps offering no projections to be engaged by cable, such for instance as the mesquite timber in Texas, the stumps of which are usually found with a growth of brush extending therefrom, but the brush is very brittle and will not stand the strain of the cable. At the same time the mesquite stump is tough and not readily withdrawn by the ordinary stump extracting apparatus on the market. The present invention is especially designed for the extraction of just such stumps, and is adapted to engage the stump in such manner as to retain its hold on the stump until the stump is extracted by constant pulling, or else the stump is severed by the gripping portions of the present improved structure, the severance occuring at a sufficient distance underground to enable a blade to pass over the remaining portion of the stump without engaging the same.

Referring to the drawing by numerals, 1 indicates a curved or hook-shaped body portion extending upwardly and forwardly forming a beam 2, and downwardly and formed into a pair of diverging downwardly and forwardly projecting arms or prongs 3, 3. The body portion 1 is preferably shouldered, as at 4, 4, at the juncture of the prongs 3, and the said prongs are spread apart in V-shape, and each of the prongs lines with its body portion substantially outside the longitudinal planes of the beam 2. The inner front longitudinal corner of each of the arms or prongs 3 is formed into a shear cut edge 5, best seen in detail in Fig. 4, adapted in practice to enter the material of the stump and to grip the same firmly for preventing slipping of the parts, and adapted to retain the hold on the stump until the stump is extracted or severed. It is to be observed that the edges 5, while sharp and penetrating, are backed by thickened portions of the prongs or arms 3, the outer front longitudinal corner of each of said prongs being strengthened by an integral, longitudinal bead 6. The beads 6 extend upwardly about the body portion 1 and longitudinally of the lower edge of the beam 2, as at 6', for reinforcing and strengthening said beam.

Handles 7, 7 may be suitably secured to the body portion 1 for facilitating adjusting the same when the present improved stump puller is being positioned with respect to a stump.

Connected to the front end of the beam 2 is a cable eye 8 to which the drawing cable or the pulling apparatus is adapted to be attached when a stump is to be extracted, and of course, the eye 8, taking as it does all of the strain of the pull on the stump, must be firmly connected to the beam to prevent parting, and in order to withstand the enormous strains to which this cable eye is subjected, the connection between the cable and the beam preferably consists of a pair of tubular, laterally extending lugs 9, each having a rearwardly flaring bore 10 through which the respective end of the cable 8 is passed. The outer end of the bore 10 is preferably of approximately the same diameter as the cable 8 and increases in diameter toward its rear end, and each of the cable ends is frayed, and the strands of the cable are bent back upon the main body of the cable, as indicated at 8', the intervening spaces being filled with Babbitt metal or other suitable filler. This arrangement is especially well adapted to prevent the ends of the cable 8 from becoming detached, and has proven in operation very efficient in withstanding severe strains.

In operation, the present improved stump puller or hook is positioned with its arms or prongs 3 on opposite sides of the stump, if the stump is small enough, or astride a root of the stump, or other portion of the stump, the forward ends of the prongs being formed into penetrating points by the incline of the front edge of the respective prong meeting with the flat or rearwardly and upwardly rounded lower edge of the prong, so that when a pull is exerted on the beam 2 the said points and the shear cut edges 5 will tend to penetrate the fiber of the stump or portion thereof engaged by the prongs, and thus as the pull increases the tendency of the prongs or arms 3 will be to increase their grip on the stump, and this increase is continued until either the stump is pulled from the ground, or is severed along the line of penetration by the shear cut edges 5. It is to be observed that the forward inclination of the shear cut edges 5 will cause descent of the stump puller or hook in its forward movement, and thus if the stump is severed, its severance will occur on an incline downwardly beneath the surface of the ground at a sufficient depth to enable the passage of a plow.

It is to be especially observed that the edges 5 while sharp and penetrating, are strengthened by a heavy backing of material designed to prevent breaking of the edges, and the entire body portion is preferably formed of steel adapted to withstand the excessive strains which must be exerted for extracting or severing the stump. The arms or prongs 3 are constructed comparatively thin transversely of the line of draft and relatively wide parallel to the line of draft, so as to prevent breaking of the prongs or arms under the strain incident to the tendency of the hook to straighten under the pull exerted by the beam and the resistance to the pull by the stump acting on the arms 3.

What I claim is:—

1. A stump puller, comprising a body portion and diverging inclined arms having cutting edges along their inner surfaces.

2. A stump puller, comprising a bifurcated inclined body portion having thin cutting edges along the inner forward corners of the arms of the bifurcation.

3. A stump puller, comprising a hook-shaped body portion formed with a pair of inclined diverging arms having cutting edges along their forward inner longitudinal corners and terminating forwardly in penetrating points.

4. A stump puller, comprising a body portion and inclined diverging arms extending forwardly therefrom, each of said arms tapering from its juncture with the body portion to a forwardly extending penetrating point, and being provided on its inner surface with a penetrating edge.

5. A stump puller, comprising a body portion and inclined diverging arms extending therefrom and adapted to inclose a stump or portion thereof, each of said diverging arms being provided with a penetrating edge.

6. A stump puller, comprising a body portion, inclined diverging arms extending therefrom, and adapted to inclose a stump or portion thereof and extending outside of the longitudinal planes of the body portion and formed with cutting edges.

7. A stump puller, comprising a relatively heavy beam and body portion formed integral and bent into the shape of a hook, the terminal portion of the hook being bifurcated and formed into two forwardly inclined, flaring arms having shear cut inner edges, and a strengthening bead extending along the outer longitudinal corner of the front edge of each of said arms and along the beam and formed integral with the body portion and beam, the free end of the beam being adapted to be engaged by draft means.

8. A stump puller, comprising a body portion, a beam extending forwardly from the upper portion thereof, and bifurcated arms extending downwardly and forwardly from the body portion, said bifurcated arms being flared apart forwardly and each of the arms tapering continuously from the juncture with the body portion to a forward, penetrating terminal point, the inner corners of the arms being formed into shear cut edges and being spaced a sufficient distance apart for inclosing a stump or portion thereof.

9. A stump puller, comprising a body portion and diverging arms extending therefrom, each having one of its longitudinal front corners forming a penetrating edge, and a strengthening bead formed integral with the other corner of the front edge of each of said arms.

10. A stump puller, comprising a body portion and a pair of diverging arms extending therefrom and having shear cut edges beveled into the material of the inner surface of the arms and provided with reinforcing enlargements contiguous to said edges for reinforcing the same.

11. A stump puller, comprising a body portion and inclined diverging arms extending therefrom of greater width parallel to the line of draft than thickness transversely of such line and formed with shear cut inner edges.

In testimony whereof I affix my signature in presence of two witnesses.

WILLIAM C. F. ZIMMERMAN.

Witnesses:
H. V. McCluskey,
John W. Jayne.